US007053896B2

(12) United States Patent
Slavin

(10) Patent No.: US 7,053,896 B2
(45) Date of Patent: May 30, 2006

(54) RESAMPLING SYSTEM AND METHOD FOR GRAPHICS DATA INCLUDING SINE-WAVE COMPONENTS

(75) Inventor: Keith R. Slavin, Beaverton, OR (US)

(73) Assignee: Micron Technology, Inc., Boise, ID (US)

( * ) Notice: Subject to any disclaimer, the term of this patent is extended or adjusted under 35 U.S.C. 154(b) by 1079 days.

(21) Appl. No.: 09/779,010

(22) Filed: Feb. 7, 2001

(65) Prior Publication Data

US 2002/0140704 A1 Oct. 3, 2002

(51) Int. Cl.
*G09G 5/22* (2006.01)
*G06K 9/32* (2006.01)

(52) U.S. Cl. ...................... 345/440; 345/586; 345/606; 382/300

(58) Field of Classification Search ........ 382/162–167, 382/254, 279, 299–300, 260–265; 345/586, 345/589, 600, 605, 606–607, 611, 613, 615, 345/618, 698, 440, 643; 348/392.1, 405.1
See application file for complete search history.

(56) References Cited

U.S. PATENT DOCUMENTS

| | | | | |
|---|---|---|---|---|
| 4,282,546 | A | 8/1981 | Reitmeier | 358/22 |
| 4,578,812 | A | 3/1986 | Yui | 382/41 |
| 4,630,307 | A | 12/1986 | Cok | 382/25 |
| 5,054,100 | A | 10/1991 | Tai | 382/47 |
| 5,703,965 | A | 12/1997 | Fu et al. | 382/232 |
| 5,889,894 | A | 3/1999 | Ito et al. | 382/300 |
| 5,930,407 | A | 7/1999 | Jensen | 382/300 |
| 5,995,682 | A | 11/1999 | Pawlicki et al. | 382/300 |
| 6,018,597 | A | 1/2000 | Maltsev et al. | 382/260 |
| 6,535,651 | B1 | 3/2003 | Aoyama et al. | 382/300 |
| 6,751,362 | B1 * | 6/2004 | Slavin | 382/299 |
| 6,795,587 | B1 * | 9/2004 | Slavin | 382/260 |
| 6,823,091 | B1 * | 11/2004 | Slavin | 382/300 |
| 6,941,031 | B1 * | 9/2005 | Slavin | 382/299 |

FOREIGN PATENT DOCUMENTS

| | | |
|---|---|---|
| EP | 300633 * | 7/1988 |
| EP | 0706262 A2 * | 4/1996 |

OTHER PUBLICATIONS

Catmull, E. et al., "A Class of Local Interpolating Splines", Computer Aided Geometric Design, New York, Academic Press, 1974, pp. 317-326.

Hill, F.S., Jr., "Computer Graphics Using Open GL", New Jersey, Prentice-Hall, 2001, pp. 643-653.

Kochanek, D. et al., "Interpolating Splines with Local Tension, Continuity, and Bias Control", Computer Graphics, vol. 18, No. 13, Jul. 1984. p. 33-41

* cited by examiner

*Primary Examiner*—Matthew C. Bella
*Assistant Examiner*—Wesner Sajous
(74) *Attorney, Agent, or Firm*—Dorsey & Whitney LLP

(57) ABSTRACT

A method and system for calculating resample output values from input samples and their associated sample values. A resampling circuit calculates a frequency value for a sine-wave model from a sample set of the input samples and determines whether the frequency value is in a frequency range. In the case where the frequency value is in the frequency range, a sinusoidal transition model is determined based on the sample set. However, if the frequency value is outside of the frequency range, a non-sinusoidal model is determined based on the sample set. The resampling circuit then calculates resample output values from the resulting sinusoidal or non-sinusoidal model.

36 Claims, 3 Drawing Sheets

RESAMPLING SYSTEM AND METHOD FOR GRAPHICS DATA INCLUDING SINE-WAVE COMPONENTS

TECHNICAL FIELD

The present invention is related generally to the field of computer graphics, and more particularly, a system and method for resampling graphics data of a source image to produce a destination image.

BACKGROUND OF THE INVENTION

As display devices of various sizes and increased resolution have been developed and the demand for them have increased, the ability for a graphics processing system to resize and resample source images and create destination images to take advantage of the various sized and higher resolution displays is a desirable operation. hi an electronic display system, color at each pixel is represented by a set of color components, and each color component is represented by a sample value. Color components such as red, green, blue (RGB) or other representations such as $YC_bC_r$ are well known in the art. Whichever representation is chosen, each color component can be interpreted as a two dimensional array of samples, so three such arrays can represent images on display systems. Conceptually, resampling can be viewed as a spatial process, working on discrete input samples, represented by pixels of the source image arranged in a two-dimensional bitmap. The output samples of the destination image are spatially located at fractional sample positions within the input sample grid. Various interpolation and modeling methods are used to construct transition models between samples of the source image from which additional graphics data is produced during the resampling operation.

The additional graphics data is then used to produce larger or higher resolution destination graphics images. However, the resulting destination image must retain an acceptable image quality with respect to the source image. That is, the destination image should appear to retain at least a similar visual qualities of the source image, such as having nearly the same color balance, contrast, and brightness as the original source image. Otherwise, rather than accurately reproducing a larger or higher resolution graphics image of the source image, the resampling operation will compromise image quality by introducing image distortion. To this end, various resampling algorithms have been developed in order to create high quality destination graphics images.

With many conventional resampling algorithms, a transition model between input samples along each axis is constructed to provide output sample values. Generally good results can be obtained with separable processing along each axis for graphics images because image feature cross-sections have the same characteristics when viewed at any angle within the image plane, only at different effective sample rates. The transition models between the input samples are constructed such that the output samples interpolated from the transition model create a destination image that closely resembles the original or source image. The transition models are typically continuous so that an output sample can be generated at any position between the input samples.

Although an axis separable cubic model between two input samples can provide a model with very desirable reconstruction characteristics, algorithms for resampling and sharpening graphics data representing video often are not suitable for resizing and resampling graphics data representing test patterns containing sine-wave components. Such test patterns are called zone plates, and are characterized by a frequency component along each axis, each of which is a function of position within the pattern. The position and frequency functions are designed to change frequencies smoothly and continuously with position.

Zone plates may be embedded within patterns testing various other attributes of a video camera, storage, transmissions or display system. They are effective in testing systems with analog components (e.g., analog modulated terrestrial broadcasting), and may provide some useful tests for spectrally based compression systems (such as DCTs used in MPEG). However, these tests generally do not correspond to any attributes of the human visual system. Nevertheless, the human eye is very adept at observing large areas of inconsistency in the presentation of these patterns. Thus, to avoid viewer complaints or feelings of disappointment (whether or not they are justified), a graphics processing system having resampling and resizing capabilities should be able to accommodate these test patterns.

Therefore, there is a need for a method and system for resampling graphics data of images having sine-wave components.

SUMMARY OF THE INVENTION

The present invention relates to a method and system for calculating resample output values from input samples and their associated sample values. A resampling circuit calculates a frequency value for a sine-wave model from a sample set of the input samples and determines whether the frequency value is in a frequency range. In the case where the frequency value is in the frequency range, a sinusoidal transition model is determined based on the sample set. However, if the frequency value is outside of the frequency range, a non-sinusoidal model is determined based on the sample set. The resampling circuit then calculates resample output values from the resulting sinusoidal or non-sinusoidal model.

DETAILED DESCRIPTION OF THE INVENTION

Embodiments of the present invention provide a method and system for calculating resampled values from a source graphics image having graphics data including sine-wave components. Certain details are set forth below to provide a sufficient understanding of the invention. However, it will be clear to one skilled in the art that the invention may be practiced without these particular details. In other instances, well-known circuits, control signals, timing protocols, and software operations have not been shown in detail in order to avoid unnecessarily obscuring the invention.

Figure 1:
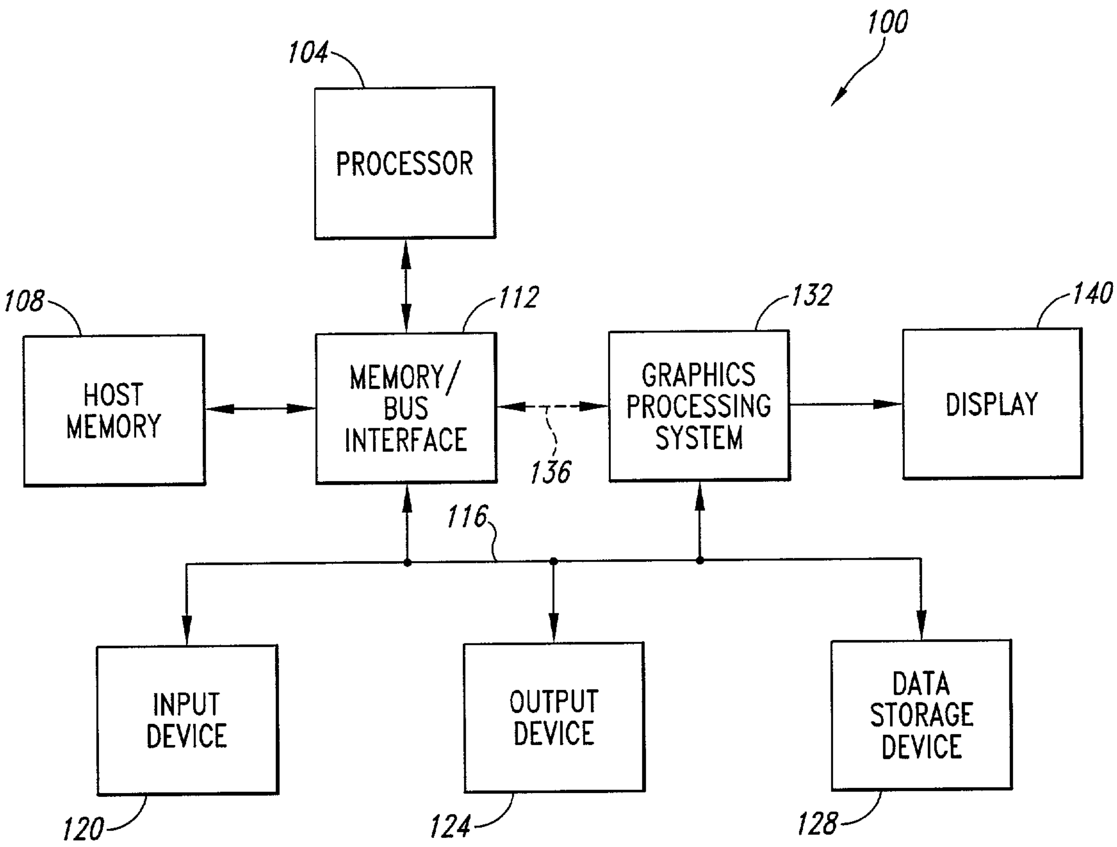
FIG. 1 is a block diagram of a computer system in which embodiments of the present invention are implemented.

FIG. 1 illustrates a computer system 100 in which embodiments of the present invention are implemented. The computer system 100 includes a processor 104 coupled to a host memory 108 through a memory/bus interface 112. The memory/bus interface 112 is coupled to an expansion bus 116, such as an industry standard architecture (ISA) bus or a peripheral component interconnect (PCI) bus. The computer system 100 also includes one or more input devices 120, such as a keypad or a mouse, coupled to the processor 104 through the expansion bus 116 and the memory/bus interface 112. The input devices 120 allow an operator or an electronic device to input data to the computer system 100. One or more output devices 120 are coupled to the processor 104 to provide output data generated by the processor 104. The output devices 124 are coupled to the processor 104 through the expansion bus 116 and memory/bus interface 112. Examples of output devices 124 include printers and a sound card driving audio speakers. One or more data storage devices 128 are coupled to the processor 104 through the memory/bus interface 112 and the expansion bus 116 to store data in, or retrieve data from, storage media (not shown). Examples of storage devices 128 and storage media include fixed disk drives, floppy disk drives, tape cassettes and compact-disc read-only memory drives.

The computer system 100 further includes a graphics processing system 132 coupled to the processor 104 through the expansion bus 116 and memory/bus interface 112. Optionally, the graphics processing system 132 may be coupled to the processor 104 and the host memory 108 through other types of architectures. For example, the graphics processing system 132 may be coupled through the memory/bus interface 112 and a high speed bus 136, such as an accelerated graphics port (AGP), to provide the graphics processing system 132 with direct memory access (DMA) to the host memory 108. That is, the high speed bus 136 and memory bus interface 112 allow the graphics processing system 132 to read and write host memory 108 without the intervention of the processor 104. Thus, data may be transferred to, and from, the host memory 108 at transfer rates much greater than over the expansion bus 116. A display 140 is coupled to the graphics processing system 132 to display graphics images. The display 140 may be any type of display, such as a cathode ray tube (CRT), a field emission display (FED), a liquid crystal display (LCD), or the like, which are commonly used for desktop computers, portable computers, and workstation or server applications.

Figure 2:
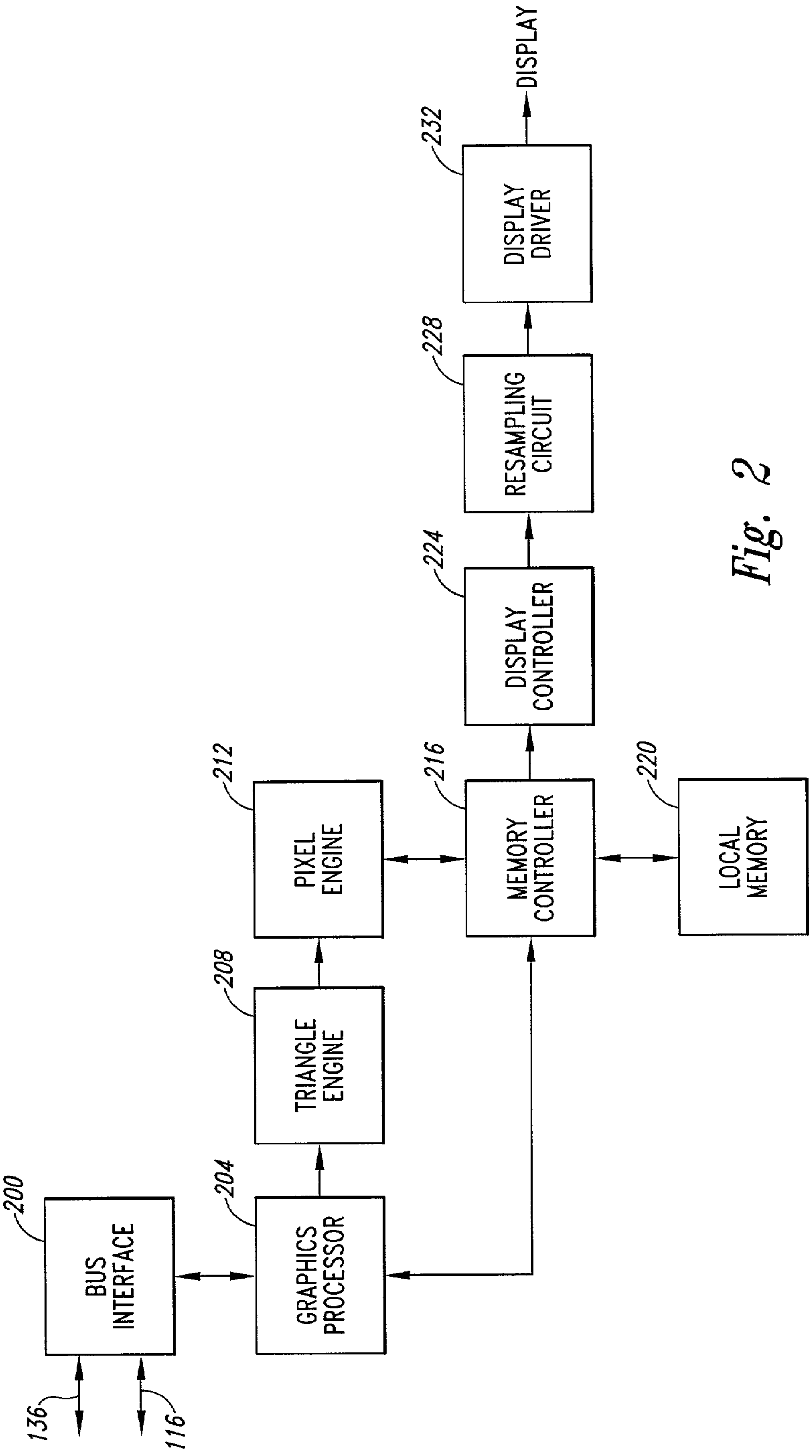
FIG. 2 is a block diagram of a graphics processing system in the computer system of FIG. 1.

FIG. 2 illustrates circuitry included within the graphics processing system 132 for performing various three-dimensional (3D) graphics functions. As shown in FIG. 2, a bus interface 200 couples the graphics processing system 132 to the expansion bus 116. In the case where the graphics processing system 132 is coupled to the processor 104 and the host memory 108 through the high speed data bus 136 and the memory/bus interface 112, the bus interface 200 will include a DMA controller (not shown) to coordinate transfer of data to and from the host memory 108 and the processor 104. A graphics processor 204 is coupled to the bus interface 200 and is designed to perform various graphics and video processing functions, such as, but not limited to, generating vertex data and performing vertex transformations for polygon graphics primitives that are used to model 3D objects. The graphics processor 204 is coupled to a triangle engine 208 that includes circuitry for performing various graphics functions, such as clipping, attribute transformations, rendering of graphics primitives, and generating texture coordinates for a texture map.

A pixel engine 212 is coupled to receive the graphics data generated by the triangle engine 208. The pixel engine 212 contains circuitry for performing various graphics functions, such as, but not limited to, texture application or mapping, bilinear filtering, fog, blending, and color space conversion. A memory controller 216 coupled to the pixel engine 212 and the graphics processor 204 handles memory requests to and from an local memory 220. The local memory 220 stores graphics data, such as source pixel color values and destination pixel color values. A display controller 224 is coupled to the memory controller 216 to receive processed destination color values for pixels that are to be rendered. Coupled to the display controller 224 is a resampling circuit 228 that facilitates resizing or resampling graphics images. As will be explained below, embodiments of the resampling circuit 228 perform approximations that simplify the calculation of a model between two sample points for use during resampling. The output color values from the resampling circuit 228 are subsequently provided to a display driver 232 that includes circuitry to provide digital color signals, or convert digital color signals to red, green, and blue analog color signals, to drive the display 140 (FIG. 1).

Although the resampling circuit 228 is illustrated as being a separate circuit, it will be appreciated that the resampling circuit 228 may also be included in one of the aforementioned circuit blocks of the graphics processing system 132. For example, the resampling circuit 228 may be included in the graphics processor 204 or the display controller 224. In other embodiments, the resampling circuit 228 may be included in the display 140 (FIG. 1). Therefore, the particular location of the resampling circuit 228 is a detail that may be modified without deviating from the subject matter of the invention, and should not be used in limiting the scope of the present invention.

Figure 3:
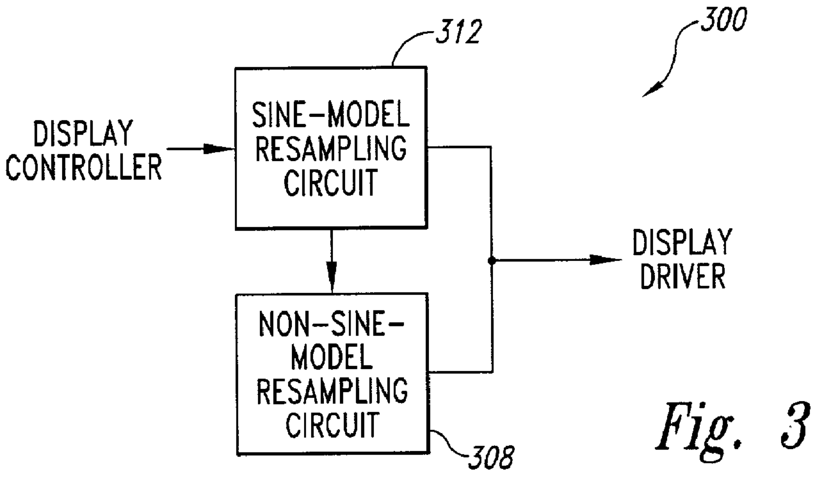
FIG. 3 is a block diagram of a resampling circuit in the graphics processing system of FIG. 2 according to an embodiment of the present invention.

FIG. 3 illustrates a resampling circuit 300 that may be substituted for the resampling circuit 228 shown in FIG. 2. The resampling circuit 300 includes a sine-model resampling circuit 312 for determining if a sample of graphics data provided by the display driver 224 (FIG. 2) is likely to include sine-wave components. As mentioned previously, the resampling operations used for resampling graphics data including sine-wave components is often different than that used for resampling other graphics data representing other types of graphics images, such as video. Although one resampling algorithm may be used, the image quality of one or the other types of graphics data will be compromised. Thus, two different resampling operations are used for the different types of graphics data, one for graphics data including sine-wave components performed by the sine-model resampling circuit 312 and one for non-sine-wave graphics data performed by a non-sine-wave resampling circuit 308.

It will be appreciated that the sample values for the samples may consist of several different components. For example, the sample value may represent pixel colors which are the combination of red, green, and blue color components. Another example includes sample values representing pixel colors which are the combination of luma and chroma components. Consequently, because it is well understood in the art, although circuitry to perform graphics operation for each of the components is not expressly shown or described herein, embodiments of the present invention include circuitry, control signals, and the like necessary to perform resampling operations on each component for multi-component sample values. Moreover, it will be appreciated that embodiments of the present invention further include the circuitry, control signals, and the like necessary to perform axis separable resampling operations for graphics data represented in multiple axes. Implementation of axis separable resampling is well understood in the art, and a more detailed description of such has been omitted from herein to avoid unnecessarily obscuring the present invention.

The non-sine-wave resampling circuit 308 can perform conventional resampling operations that are well known to those of ordinary skill in the art. Alternatively, a resampling operation such as that described in co-pending application having U.S. Ser. No. 09/760,173, entitled PIXEL RESAMPLING SYSTEM AND METHOD to Slavin, filed Jan. 12, 2001, which is incorporated herein by reference, can also be performed by the non-sine-wave resampling circuit 308. In summary, the subject matter of the aforementioned patent application includes generating a cubic model for transitions between adjacent samples from the sample values and the gradient values cosited with the two samples. The cosited gradients are approximated to facilitate generation of the transition model. The coefficients for the cubic model are determined from the known values and used by a cubic model evaluation circuit to calculate resampled values between the adjacent samples. As will be explained in more detail below, the cubic model evaluation circuit described in the aforementioned patent application may be used with the present invention to determine resampled values for graphics data including sine-wave components.

In operation, when a resampling operation is to be performed, the resampling circuit 228 (FIG. 2) becomes active and sine-model resampling circuit 312 receives sample values for the samples of graphics data of the source image to be resampled. As will be explained in more detail below, based on a sampling of the graphics data received by the resampling circuit 300, the sine-model resampling circuit 312 determines whether the graphics data includes sine-model components. If so, the sine-model resampling circuit 312 performs the resampling operation on the graphics data. All other graphics data is provided to the non-sine-model resampling circuit 308 for the resampling operation. The sine-model resampling circuit 308 performs operations of fitting a sine-model to the sample of graphics data it receives. Each of the respective resampling circuits perform various operations to resample the graphics data received from display controller 224 (FIG. 2) to produce a resampled graphics image. The resampled data generated by the resampling circuits are subsequently used in the process of rendering enlarged or higher resolution graphics images.

Although graphics data including sine-wave components may change frequency with position, such as in a zone plate test pattern, the sine-model resampling circuit 312 performs the operation with localized processing. Thus, the zone plate can be regarded as having a fixed frequency in each axis over a small region. For the small region, algorithms can be used to find the parameters for the equation:

$$V_p = A\sin(\omega p + \phi) + B$$

where p is a local input sample position value along each axis, and $V_p$ is an input sample value at position p. Although the previous equation has four unknowns, and consequently requires only four adjacent sample values, for reasons that will be explained later, we use five samples along each axis with a position index p of zero as the center of the samples. Initially, a set of four samples $S_{0 \ldots 3} = V_{-2 \ldots 1}$ is selected. The values of the selected sample set are used to solve the following equations to obtain angular frequency ω:

$$d_1 = S_0 - S_3$$

$$d_2 = S_1 - S_2$$

$$\cos w = \frac{\left(\frac{d_1}{d_2} - 1\right)}{2}$$

if(cos w)<−0.95 then ω=arc cos(−0.95), else if(cos w)<0.9 then ω=arc cos(cos w) else NOT-A-SINE.

The value of the angular frequency ω is limited to ω≧a cos (−0.95) to prevent the value from going too near π=a cos (−1), the maximum angular frequency which causes ill-conditioned behavior at later stages of processing. Although the frequency limit ω≧a cos (−0.95) may introduce minor errors during the following sine-model fit operation, which will be described below, the frequency limit creates the appearance of a gradual and benign "fade-out" on zone-plate patterns near π. It will be appreciated, however, that limit values nearer to −1 are possible with low-noise, higher accuracy data.

Figure 4:
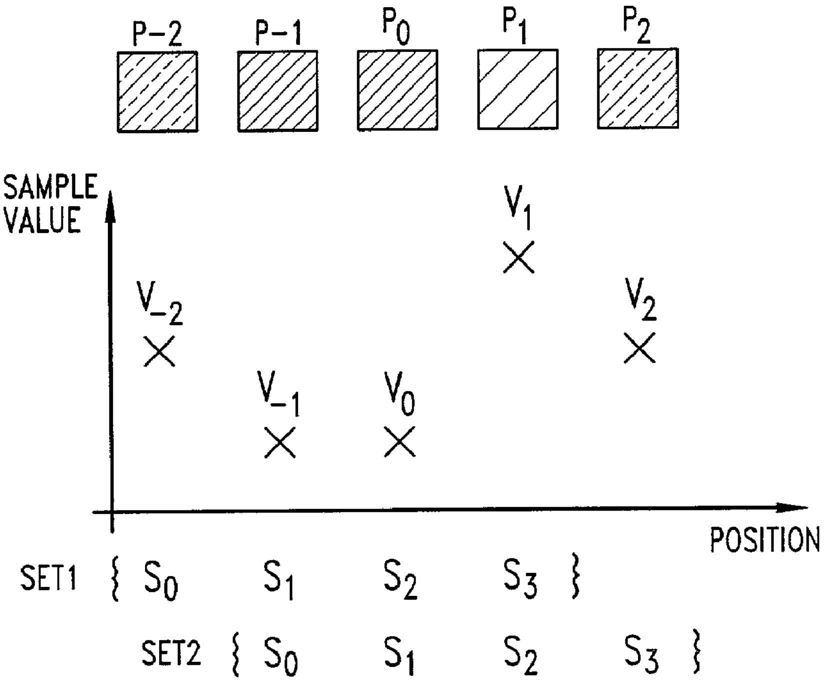
FIG. 4 is a diagram representing a sample of graphics data and corresponding sample values.

In the case where $d_2$ is zero, the samples are positioned symmetrically around a peak midway between samples $S_1$ and $S_2$. Such a situation presents an infinity of sine-wave solutions, and consequently, poorly conditioned equations. However, as shown in FIG. 4, this issue may be addressed by providing the sine-model resampling circuit 312 (FIG. 3) using five samples instead of four. That is, $d_2$ is evaluated by the sine-model resampling circuit 312 from the middle two samples for each of the candidate sets of four samples:

$$S_{0 \ldots 3} = V_{-2 \ldots 1}$$

$$S_{0 \ldots 3} = V_{-1 \ldots 2}$$

The set {V} with the largest $|d_2|$ is selected and used to obtain a reliable estimate of the angular frequency ω.

If the maximum of $d_2$ from both sets of four samples still results in an angular frequency ω that is near 0 (i.e., cos(ω)>0.9), then the samples are ill-conditioned, most likely the result from sine-waves components of very low amplitude or frequency. As a result, a NOT-A-SINE error is returned for the five samples. It will be appreciated that the limit of cos(ω)>0.9 may be modified for different noise and accuracy conditions. However, using the present limit will typically result in one of the sets of sample values {S} yielding a useful $d_2$ value, and thus, provide good measurement results. Where a NOT-A-SINE error is produced, the graphics data is provided to the non-sine-model resampling circuit 308 where an alternative interpolation algorithm is performed instead. As mentioned previously, various suitable interpolation algorithms may be performed there.

Once a set of {S} values has been selected by the sine-model resampling circuit 312 and the angular frequency ω obtained, a sine fit can be obtained by finding {A, ϕ, B} from the sine-model equation:

$$V_p = A\sin(\omega p + \phi) + B.$$

The values for amplitude A, phase ϕ, and offset B can be solved by the sine-model resampling circuit 312 using values that are already known, namely, the angular frequency ω, and the sample values of the middle three samples $\{V_{-1}, V_0, V_1\}$ of the five samples previously mentioned. While it would be possible to perform a least-squares fit to more than three samples, using a three-sample fit provides the benefit of simplicity, and additionally, ensures that the resulting model will go through the original three sample points. Moreover, as will be explained in further detail below, additional tests can be performed by the sine-model resampling circuit 312 on the resulting three sample fit model to confirm that it is not fitting sine-models to transitions between samples of graphics data not including sine-wave components. Solving the three-sample point equations results in:

$$A\cos(\phi) = A\text{COS} = \frac{V_1 - V_{-1}}{2\sin(\omega)}$$

$$A\sin(\phi) = A\text{SIN} = \frac{V_1 + V_{-1} - 2V_0}{2(\cos(\omega) - 1)}$$

$$B = V_0 - A\text{SIN}$$

which provides the offset B directly. The phase and amplitude can then be obtained directly through a rectangular to polar coordinate conversion:

$$\phi = \arctan2(A\text{SIN}, A\text{COS})$$

$$A = \sqrt{(A\text{SIN})^2 + (A\text{COS})^2}.$$

After the sine-model resampling circuit 312 resolves the {A, ϕ, B} values from the previous equations, the resulting sine-model can be evaluated to directly obtain resampled values from the source image. Note that the phase ϕ is coincident with the middle of the three samples values $V_0$, and that the four-quadrant a tan 2(y,x) function is used. Further note that in the case where ω=0 or ω=π, a division by zero occurs. However, these values should have been excluded previously.

An alternative approach to determining resampled values according to a sine-model results from applying the A SIN and A COS values used in resolving the offset value B. Expanding the sine-model equation discussed earlier results in:

$$R_p = A\ \sin(\phi)\cos(\omega p) + A\ \cos(\phi)\sin(\omega p) + B$$

where $R_p = V_p$ for p={−1,0,1}. As discussed previously, the values for A sin(ϕ) and A cos(ϕ), and the angular frequency ω were determined to calculate the offset value B. Thus, $R_p$ can be evaluated at any fractional position p=Δp by substituting these values into the expanded sine-model equation to obtain a resampled result in each axis between the samples $V_{-1}$ and $V_0$.

As a means of verifying the accuracy of the sine-model generated through the three samples {$V_{-1}$, $V_0$, $V_1$}, the model is evaluated at the positions of the first and last of the five samples (i.e., at positions $V_{-2}$ and $V_2$) using the following equation:

$$diff_A = |R_{-2} - V_{-2}|$$

$$diff_B = |R_2 - V_2|$$

$$\text{threshold} = \frac{A}{4}$$

if (($diff_A$>threshold) or ($diff_B$>threshold)) then NOT-A-SINE.

The threshold value is set to a fraction of the amplitude of the fitted sine wave, which allows for some noise and distortions due to assumptions that the angular frequency ω is constant, or that X may have been limited near π as previously discussed. A scaling value of ¼ works quite well, and is easy to implement, but it will be appreciated that other values are possible depending upon noise levels. This test rejects fits on edges because the outlying samples will fit badly to a sine-model which was fitted to the central three samples{$V_{-1}$, $V_0$, $V_1$}.

Note that cos(−x)=cos(x) and sin(−x)=−sin(x). Consequently, cos(−2ω) and sin (−2ω) can be calculated by sharing look-up tables when obtaining $R_{-2}$ and $R_2$. Moreover, $diff_A$ can be determined using two ROM tables to obtain the sin(2ω) and cos(2ω) values, along with two multiplies and two adders. As just discussed, only two more multipliers and adders are needed to obtain $diff_B$.

As an alternative, rather than calculating the amplitude A precisely using the equation:

$$A = \sqrt{(A\text{SIN})^2 + (A\text{COS})^2}$$

which involves division operations and makes the calculations more difficult and complex to solve, a usable amplitude A can be approximated for the verification operation because the value is used only as a threshold for determining the accuracy of the resulting sine-model. An economical approximation of the amplitude A to better than 5% accuracy can be obtained using:

$$s = |A\text{SIN}|$$

$$c = |A\text{COS}|$$

$$\text{if } (s > c)\ A \approx s + \frac{c}{2} \text{ else } A \approx c + \frac{s}{2}.$$

An incrementer (for 2's complement negation), and a multiplexer can be used to obtain the absolute value of s and c. A compare, a multiplexer, and an adder are used for the remaining operations.

As mentioned previously, resampled values for a sine-model may be directly determined from the sine-model equation:

$$R_p = A\ \sin(\phi)\cos(\omega p) + A\ \cos(\phi)\sin(\omega p) + B.$$

However, the arithmetic for directly obtaining the resampled value is relatively complex, so the resulting system is expensive in hardware. As an alternative to solving the sine-model directly, a cubic model system may be used to determine resampled values. This method of determining the resampled values may be desirable where a resampling circuit is equipped with an cubic model evaluation block. The resampling operation employs a conventional cubic evaluation circuit, which is well known in the art. Although not described in greater detail herein, implementation of a cubic model evaluation block is well understood by those of ordinary skill in the art, and the description provided herein is sufficient to allow one to practice the invention without undue experimentation. Additionally, as mentioned previously, a cubic evaluation circuit suitable for implementing embodiments of the present invention is included in the system described in the aforementioned co-pending patent application, PIXEL RESAMPLING SYSTEM AND METHOD.

A cubic model may be used between two input samples p and p+1 to provide a continuous model having desirable reconstruction characteristics for graphics images. A piece-wise cubic polynomial model along an axis will be valid over a fractional input sample position Δp from 0 to 1. Consequently, the model is valid from integer sample position p to p+1:

$$f(P+\Delta p)=\sum_{i=0}^{3} C[P,i](\Delta p)^{i}.$$

The resulting cubic model will go through the two input samples p and p+1.

As is well known, a cubic model can be solved with four constraints. Two of these constraints may be provided by the sample values $f_p$ and $f_{p+1}$ at the two input samples p and p+1. These sample values are known. Two additional constraints may be provided by the gradients $gr_p$ and $gr_{p+1}$ at, or co-sited with, the two input samples p and p+1. To solve the cosited gradients, the equation for the cubic model is differentiated with respect to Δp, resulting in:

$$gr(P+\Delta p)=\sum_{i=0}^{3} iC[P,i](\Delta p)^{i-1}.$$

Evaluating the two equations at Δp={0, 1 }, and solving for the four coefficients C[P, i] at the relative positions of the contributors to the cubic model are of interest results in coefficients:

$$k=f_1-f_0$$

$$C_3=gr_1+gr_0-2k$$

$$C_2=k-C_3-gr_0$$

$$C_1=gr_0$$

$$C_0=f_0$$

for the cubic equation:

$$f(\Delta p)=\sum_{i=0}^{3} (C_i(\Delta p))^{i}.$$

The resulting cubic equation, along with the gradients $gr_0$ and $gr_1$ and the sample values $f_0$ and $f_1$ for the two input samples p and p+1 provides a piece-wise continuous model for resampling.

Differentiating the sine-model equation with respect to the angular frequency ω to find the gradients $gr_p$ results in:

$$gr_p=-A\sin(\phi)\times\omega\sin(\omega p)+A\cos(\phi)\times\omega\cos(\omega p).$$

This model can obtain valid gradients at position p={−1,0,1 }, cosited with the original fitted samples. The gradients are then passed to the cubic evaluation block to generate a resampled output point. This approach is less accurate than calculating resampled values directly through a sine-model fit because the cubic interpolation system cannot approximate the significant higher order polynomial terms in Δp that are present in sine waves at higher frequencies. This distortion along the x-axis further compounds errors along the y-axis. However, good results can be obtained up to near 0.9 of the Nyquist sampling limit. Moreover, although two output values (gradients) are evaluated instead of one for the sine model case, the values are cosited with the input samples at discrete sample times, so asp is an integer, the hardware to evaluate $gr_p$ is much simpler. Note that the cubic evaluation circuit which follows should be there in any case for non-sinusoids.

As mentioned previously, embodiments of the invention have been described herein with sufficient detail to allow a person of ordinary skill in the art to practice the invention. Implementation of many of the algorithms previously described may be implemented by conventional circuitry. For example, determining the angular frequency ω can be implemented using logarithm ROMs, and the corresponding anti-logarithm and limit detection can be built into another ROM. Thus, only three ROMs and three address to obtain ω once a data {S} set has been selected. Another example is using a comparator to determine the largest |d2| calculated for the two sets of samples and a multiplexer to select the final data set of {S} to estimate the angular frequency ω. Thus, in order to prevent unnecessarily obscuring the invention, a more detailed description of the implementation of various aspects of the invention have been omitted from herein.

From the foregoing it will be appreciated that, although specific embodiments of the invention have been described herein for purposes of illustration, various modifications may be made without deviating from the spirit and scope of the invention. Accordingly, the invention is not limited except as by the appended claims.

The invention claimed is:

1. A method for calculating output sample values from input graphics data having corresponding input sample values, the method comprising:

calculating from a sample set of input graphics data an angular frequency value ω for a sine-wave model and determining whether the frequency value ω is in a frequency range;

where the frequency value ω is in the range, determining from the sample set a first model from which output sample values are calculated;

where the frequency value ω is the range, determining from the sample set a second model from which output sample values are calculated; and calculating output sample values from the resulting model.

2. The method of claim 1 wherein the second model comprises a non-sinusoidal transition model.

3. The method of claim 1 wherein the second model comprises a cubic transition model between two of the input samples.

4. The method of claim 1 wherein the frequency range comprises arc cos(−0.95)≦ω<arc cos(0.9).

5. The method of claim 1 wherein the sample set includes first, second, third, fourth, and fifth input samples and the respective input sample values, and calculating the angular frequency value ω comprises calculating the frequency value ω as:

$$\omega=\arccos\left(\frac{\left(\frac{d_1}{d_2}-1\right)}{2}\right),$$

where $d_1=(V_{-1}-V_2)$ and

-continued $$d_2 = (V_0 - V_1) \text{ if } |V_0 - V_1| > |V_{-1} - V_0|,$$

$$\text{otherwise } d_1 = (V_{-2} - V_1) \text{ and } d_2 = (V_{-1} - V_0),$$

where $V_{-2}$, $V_{-1}$, $V_0$, $V_1$, and $V_2$, are the first, second, third, fourth, and fifth values, respectively.

6. The method of claim 5 wherein the first model comprises a sine-wave model and the output sample values are calculated from the equation:

$$V_p = A\sin(\omega p + \phi) + B,$$

where $V_p$ is the output sample value at position p, ω is the angular frequency, $$B = V_0 - ASIN,$$

$$\phi = \arctan2(ASIN, ACOS), \text{ and}$$

$$A = \sqrt{(ASIN)^2 + (ACOS)^2},$$

$$\text{where } ACOS = \frac{V_1 - V_{-1}}{2\sin(\omega)} \text{ and } ASIN = \frac{V_1 + V_{-1} - 2V_0}{2(\cos(\omega) - 1)}.$$

7. The method of claim 5 wherein the first model comprises a sine-wave model and the output sample values are calculated from the equation:

$$R_p = A\sin(\phi)\cos(\omega p) + A\cos(\phi)\sin(\omega p) + B,$$

where $R_p$ is the output sample value at position p, ω is the angular frequency, $$B = V_0 - ASIN,$$

$$A\cos(\phi) = \frac{V_1 - V_{-1}}{2\sin(\omega)}, \text{ and } A\sin(\phi) = ASIN = \frac{V_1 + V_{-1} - 2V_0}{2(\cos(\omega) - 1)}.$$

8. The method of claim 7, further comprising verifying the accuracy of the sine-wave model calculated from the input samples at the first and fifth input samples.

9. The method of claim 8 wherein verifying the accuracy of the sine-wave model comprises calculating:

$$diff_A = |R_{-2} - V_{-2}| \text{ and } diff_B = |R_2 - V_2|; \text{ and}$$

confirming that $diff_A$ or $diff_B$ is less than a fraction of A, otherwise, calculating output sample values from the second model.

10. The method of claim 9 wherein the fraction of A is one-fourth.

11. The method of claim 9, further comprising estimating A from:

$$A \approx s + \frac{c}{2} \text{ if } (s > c),$$

$$\text{otherwise } A \approx c + \frac{s}{2},$$

$$\text{where } s = |ASIN| \text{ and } c = |ACOS|.$$

12. The method of claim 5 wherein the first model comprises a cubic model and the output sample values are calculated from the equation:

$$f(\Delta p) = \sum_{i=0}^{3} (C_i(\Delta p))^i,$$

where $k = V_1 - V_0$, $C_3 = gr_1 + gr_0 - 2k$, $C_2 = k - C_3 - gr_0$, $C_1 = gr_0$, $C_0 = V_0$, and $gr_p = -A\sin(\phi)\times\omega\sin(\omega p) + A\cos(\phi)\times\omega\cos(\omega p)$, where $gr_p$ is the gradient value cosited at position p, ω is the angular frequency, $$A\cos(\phi) = ACOS V_1 - \frac{V_{-1}}{2\sin(\omega)}, \text{ and}$$

$$A\sin(\phi) = ASIN = \frac{V_1 + V_{-1} - 2V_0}{2(\cos(\omega) - 1)}.$$

13. A method for calculating a transition model from input graphics data having corresponding input sample values, the method comprising:

selecting a sample set of input graphics data including first, second, third, fourth, and fifth input samples, $V_{-2}$, $V_{-1}$, $V_0$, $V_1$, and $V_2$, respectively;

calculating from the sample set an angular frequency value ω, where $$\omega = \arccos\left(\frac{\left(\frac{d_1}{d_2} - 1\right)}{2}\right),$$

$$d_1 = (V_{-1} - V_2) \text{ and } d_2 = (V_0 - V_1) \text{ if } |V_0 - V_1| > |V_{-1} - V_0|,$$

$$\text{otherwise } d_1 = (V_{-2} - V_1) \text{ and } d_2 = (V_{-1} - V_0);$$

determining whether the frequency value ω is in a frequency range;

where the frequency value ω is in the frequency range, calculating output sample values from the equation:

$$V_p = A\sin(\omega p + \phi) + B,$$

where $V_p$ is the output sample value at position p, $$B = V_0 - ASIN,$$

$$\phi = \arctan2(ASIN, ACOS), \text{ and}$$

$$A = \sqrt{(ASIN)^2 + (ACOS)^2},$$

$$\text{where } ACOS = \frac{V_1 - V_{-1}}{2\sin(\omega)} \text{ and } ASIN = \frac{V_1 + V_{-1} - 2V_0}{2(\cos(\omega) - 1)}; \text{ and}$$

otherwise, calculating output sample values from a non-sinusoidal transition model derived from the sample set.

14. The method of claim 13 wherein the non-sinusoidal transition model comprises a cubic transition model between two of the input samples.

15. The method of claim 13 wherein the frequency range comprises arc $\cos(-0.95) \leqq \omega < \text{arc}\cos(0.9)$.

16. A method for calculating a transition model from input graphics data having corresponding input sample values, the method comprising:

selecting a sample set of input graphics data including first, second, third, fourth, and fifth input samples, $V_{-2}$, $V_{-1}$, $V_0$, $V_1$, and $V_2$, respectively;

calculating from the sample set an angular frequency value ω for a sine-wave model, where $$\omega = \arccos\left(\frac{\left(\frac{d_1}{d_2} - 1\right)}{2}\right),$$

$$d_1 = (V_{-1} - V_2) \text{ and } d_2 = (V_0 - V_1) \text{ if } |V_0 - V_1| > |V_{-1} - V_0|,$$

$$\text{otherwise } d_1 = (V_{-2} - V_1) \text{ and } d_2 = (V_{-1} - V_0);$$

determining whether the frequency value ω is in a frequency range;

where the frequency value ω is in the frequency range, calculating output sample values from the equation:

$$R_p = A\sin(\phi)\cos(\omega p) + A\cos(\phi)\sin(\omega p) + B,$$

where $R_p$ is the output sample value at position p, ω is an angular frequency, $$B = V_0 - A\mathrm{SIN},$$

$$\phi = \arctan2(A\mathrm{SIN}, A\mathrm{COS}), \text{ and}$$

$$A = \sqrt{(A\mathrm{SIN})^2 + (A\mathrm{COS})^2},$$

$$\text{where } A\cos(\phi) = A\mathrm{COS} = \frac{V_1 - V_{-1}}{2\sin(\omega)} \text{ and}$$

$$A\sin(\phi) = A\mathrm{SIN} = \frac{V_1 + V_{-1} - 2V_0}{2(\cos(\omega) - 1)}; \text{ and}$$

otherwise, calculating output sample values from a non-sinusoidal transition model derived from the sample set.

17. The method of claim 16 wherein the non-sinusoidal transition model comprises a cubic transition model between two of the input samples.

18. The method of claim 16 wherein the frequency range comprises arc cos(−0.95)≦ω<arc cos(0.9).

19. The method of claim 16, further comprising verifying the accuracy of the sine-wave model calculated from the input samples at the first and fifth input samples.

20. The method of claim 19 wherein verifying the accuracy of the sine-wave model comprises calculating:

$$diff_A = |R_{-2} - V_{-2}| \text{ and } diff_B = |R_2 - V_2|; \text{ and}$$

confirming that $diff_A$ or $diff_B$ is less than a fraction of A, otherwise, calculating output sample values from the second model.

21. The method of claim 20 wherein the fraction of A is one-fourth.

22. The method of claim 20, further comprising estimating A from:

$$A \approx s + \frac{c}{2} \text{ if } (s > c),$$

$$\text{otherwise } A \approx c + \frac{s}{2},$$

$$\text{where } s = |A\mathrm{SIN}| \text{ and } c = |A\mathrm{COS}|.$$

23. A method for calculating a transition model from input graphics data having corresponding input sample values, the method comprising:

selecting a sample set of input graphics data including first, second, third, fourth, and fifth input samples, $V_{-2}$, $V_{-1}$, $V_0$, $V_1$, and $V_2$, respectively;

calculating from the sample set an angular frequency value ω, where $$\omega = \arccos\left(\frac{\left(\frac{d_1}{d_2} - 1\right)}{2}\right),$$

$$\text{where } d_1 = (V_{-1} - V_2) \text{ and } d_2 = (V_0 - V_1)$$

$$\text{if } |V_0 - V_1| > |V_{-1} - V_0|,$$

$$\text{otherwise } d_1 = (V_{-2} - V_1) \text{ and } d_2 = (V_{-1} - V_0);$$

determining whether the frequency value ω is in a frequency range;

where the frequency value ω is in the range, calculating output sample values from the cubic equation:

$$f(\Delta p) = \sum_{i=0}^{3} (C_i(\Delta p))^i,$$

where $k = V_1 - V_0$, $C_3 = gr_1 + gr_0 - 2k$, $C_2 = k - C_3 - gr_0$, $C_1 = gr_0$, $C_0 = V_0$, and $gr_p = -A\sin(\phi)\times\omega\sin(\omega p) + A\cos(\phi)\times\omega\cos(\omega p)$, where $gr_p$ is the gradient value cosited at position p, ω is the angular frequency, $$\phi = \arctan2(A\mathrm{SIN}, A\mathrm{COS}), \text{ and}$$

$$A = \sqrt{(A\mathrm{SIN})^2 + (A\mathrm{COS})^2},$$

$$\text{where } A\cos(\phi) - A\mathrm{COS} = \frac{V_1 - V_{-1}}{2\sin(\omega)} \text{ and}$$

$$A\sin(\phi) = A\mathrm{SIN} = \frac{V_1 + V_{-1} - 2V_0}{2(\cos(\omega) - 1)}; \text{ and}$$

otherwise, calculating output sample values from a non-sinusoidal transition model derived from the sample set.

24. The method of claim 23 wherein the non-sinusoidal transition model comprises a cubic transition model between two of the input samples.

25. The method of claim 23 wherein the frequency range comprises arc cos(−0.95)≦ω<arc cos(0.9).

26. A resampling circuit for providing resample output values calculated from sample values of input pixel samples, the resampling circuit comprising:

a sine-wave model resampling circuit adapted to receive signals representing respective sample values for input pixel samples, the sine-wave model resampling circuit calculating from a sample set of the sample values an angular frequency value ω for a sine-wave model and determining whether the frequency value ω is in a frequency range, and where the frequency value ω is in the frequency range, determining from the sample set a sinusoidal model from which the resample output values are calculated and calculating resample output sample values from the resulting sinusoidal model; and a non-sine-wave model resampling circuit coupled to the sine-wave model resampling circuit to receive the sample values of the sample set when the frequency value ω is outside of the frequency range, the non-sine-wave model resampling circuit determining from the sample set a non-sinusoidal model from which the resample output sample values are calculated and calculating resample output sample values from the resulting non-sinusoidal model.

27. A resampling circuit adapted to receive signals representing respective sample values for input pixel samples and provide resample output values, the resampling circuit operable to calculate from a sample set of the sample values an angular frequency value ω for a sine-wave model and determine whether the frequency value ω is in a frequency range, and where the frequency value ω is in the frequency range, further operable to determine from the sample set a sinusoidal model from which the resample output values are calculated and where the angular frequency value ω is not in the frequency range, operable to determine from the sample set a non-sinusoidal model from which the resample output sample values are calculated, the resampling circuit further operable to calculate resample output sample values from the resulting model.

28. The resampling circuit of claim 27 wherein the non-sinusoidal model comprises a cubic transition model between two of the input samples.

29. The resampling circuit of claim 27 wherein the frequency range comprises arc $\cos(-0.95) \leqq \omega < \text{arc}\cos(0.9)$.

30. The resampling circuit of claim 27 wherein the sample set includes first, second, third, fourth, and fifth input samples and the respective input sample values, and the resampling circuit calculates the angular frequency value ω from:

$$\omega = \arccos\left(\frac{\left(\frac{d_1}{d_2} - 1\right)}{2}\right),$$

$$\text{where } d_1 = (V_{-1} - V_2) \text{ and}$$

$$d_2 = (V_0 - V_1) \text{ if } |V_0 - V_1| > |V_{-1} - V_0|,$$

$$\text{otherwise } d_1 = (V_{-2} - V_1) \text{ and } d_2 = (V_{-1} - V_0),$$

where $V_{-2}$, $V_{-1}$, $V_0$, $V_1$, and $V_2$, are the first, second, third, fourth, and fifth values, respectively.

31. The resampling circuit of claim 30 wherein the sine-wave model and the output sample values are calculated by the resampling circuit from the equation:

$$V_p = A\sin(\omega p + \phi) + B,$$

where $V_p$ is the output sample value at position p, ω is an angular frequency calculated from the input samples, $$B = V_0 - ASIN,$$

$$\phi = \text{arctan2}(ASIN, ACOS), \text{ and}$$

$$A = \sqrt{(ASIN)^2 + (ACOS)^2},$$

$$\text{where } ACOS = \frac{V_1 - V_{-1}}{2\sin(\omega)} \text{ and } ASIN = \frac{V_1 + V_{-1} - 2V_0}{2(\cos(\omega) - 1)}.$$

32. The resampling circuit of claim 30 wherein the sine-wave model and the output sample values are calculated by the resampling circuit from the equation:

$$R_p = A\sin(\phi)\cos(\phi p) + A\cos(\phi)\sin(\omega p) + B,$$

where $R_p$ is the output sample value at position p, ω is the angular frequency, $$B = V_0 - ASIN,$$

$$\phi = \text{arctan2}(ASIN, ACOS), \text{ and}$$

$$A = \sqrt{(ASIN)^2 + (ACOS)^2},$$

$$\text{where } A\cos(\phi) = ACOS = \frac{V_1 - V_{-1}}{2\sin(\omega)} \text{ and}$$

$$A\sin(\phi) = ASIN = \frac{V_1 + V_{-1} - 2V_0}{2(\cos(\omega) - 1)}.$$

33. The resampling circuit of claim 32 further verifying the accuracy of the sine-wave model by calculating:

$$diff_A = |R_{-2} - V_{-2}| \text{ and } diff_B = |R_2 - V_2|; \text{ and}$$

confirming that $\text{diff}_A$ or $\text{diff}_B$ is less than a fraction of A, otherwise, calculating output sample values from the second model.

34. The resampling circuit of claim 33 wherein the fraction of A is one-fourth.

35. The resampling circuit of claim 33 further estimating A from:

$$A \approx s + \frac{c}{2} \text{ if}(s > c),$$

$$\text{otherwise } A \approx c + \frac{s}{2},$$

$$\text{where } s = |ASIN| \text{ and } c = |ACOS|.$$

36. The resampling circuit of claim 27 the sine-wave model and the output sample values are calculated by the resampling circuit from the equation:

$$f(\Delta p) = \sum_{i=0}^{3} (C_i(\Delta p))^i,$$

where $k = V_1 - V_0$, $C_3 = gr_1 + gr_0 - 2k$, $C_2 = k - C_3 - gr_0$, $C_1 = gr_0$, $C_0 = V_0$, and $gr_p = -A\sin(\phi) \times \omega\sin(\omega p) \times A\cos(\phi) \times \omega\cos(\omega p)$, where $gr_p$ is the gradient value cosited at position p, ω is the angular frequency, $$\phi = \text{arctan2}(ASIN, ACOS), \text{ and}$$

$$A = \sqrt{(ASIN)^2 + (ACOS)^2},$$

$$\text{where } A\cos(\phi) = ACOS = \frac{V_1 - V_{-1}}{2\sin(\omega)} \text{ and}$$

$$A\sin(\phi) = ASIN = \frac{V_1 + V_{-1} - 2V_0}{2(\cos(\omega) - 1)}.$$

* * * * *